United States Patent [19]

Cahen et al.

[11] Patent Number: 4,559,282
[45] Date of Patent: Dec. 17, 1985

[54] STABLE N-CUINSE$_2$/IODIDE-IODINE PHOTOELECTROCHEMICAL CELL

[75] Inventors: David Cahen, Rehovot, Israel; Yih W. Chen, Lakewood, Colo.

[73] Assignee: The United States of America as represented by the United States Department of Energy, Washington, D.C.

[21] Appl. No.: 652,396

[22] Filed: Sep. 20, 1984

[51] Int. Cl.$^4$ .............................................. H01M 6/36
[52] U.S. Cl. .................................. 429/111; 204/290 R; 427/74
[58] Field of Search ..................... 429/111; 204/290 R; 427/74

[56] References Cited

U.S. PATENT DOCUMENTS 4,180,625 12/1979 Wagner ................................. 429/111
4,386,142 5/1983 Hodes et al. ......................... 429/111
4,388,382 6/1983 Bachmann et al. .................. 429/111

OTHER PUBLICATIONS

K. J. Bachmann et al., *Surface Science*, vol. 138, pp. 475–487, (1984).
S. Menezes, *Appl. Phys. Lett.*, vol. 45, pp. 148–149, (1984).

Primary Examiner—Aaron Weisstuch
Attorney, Agent, or Firm—Kenneth L. Richardson; James W. Weinberger; Judson R. Hightower

[57] ABSTRACT

In a photoelectrochemical solar cell, stable output and solar efficiency in excess of 10% are achieved with a photoanode of n-CuInSe$_2$ electrode material and an iodine/iodide redox couple used in a liquid electrolyte. The photoanode is prepared by treating the electrode material by chemical etching, for example in Br$_2$/MeOH; heating the etched electrode material in air or oxygen; depositing a surface film coating of indium on the electrode material after the initial heating; and thereafter again heating the electrode material in air or oxygen to oxidize the indium. The electrolyte is treated by the addition of Cu$^+$ or Cu$^{2+}$ salts and In$^{3+}$ salts.

24 Claims, 5 Drawing Figures n-CuInSe$_2$/I$_n^-$

STABLE N-CUINSE₂/IODIDE-IODINE PHOTOELECTROCHEMICAL CELL

CONTRACTUAL ORIGIN OF THE INVENTION

The U.S. Government has rights in this invention pursuant to Contract No. DE-AC02-83CH10093 between the U.S. Department of Energy and the Solar Energy Research Institute, a division of the Midwest Research Institute.

BACKGROUND OF THE INVENTION

1. Field of the Invention

The present invention relates to batteries, thermoelectric and photoelectric, especially to photoelectric cells containing selenium or tellurium and containing copper, lead, or zinc. More specifically, the invention relates to a process for fabricating a photoelectrochemical solar cell consisting of n-$CuInSe_2$ electrode material and having an iodide/iodine redox couple.

2. Description of the Prior Art

An economic solar cell should have a solar conversion efficiency of over 10%. A 5.6% solar efficiency was observed for a liquid junction photoelectrochemical cell using n-$CuInSe_2$ as the photoanode, etched in 3:1 (V/V) $HCl:HNO_3$, $H_2O$ rinse, 0.1 M KCN and $H_2O$ rinse, and with a polysulfide redox electrolyte. Y. Mirovsky and D. Cahen, *Appl. Phys. Lett.* 40(8), 727 (1982). This system showed stable output efficiency, although it was recognized that improvement was needed in open circuit voltage and fill factor if the cell was to be of practical use as a solar cell. One possible cause for the low open circuit voltage was speculated to be microcracks and pits on the surface of the electrodes.

An improved cell using n-$CuInSe_2$ with different interface kinetics is reported to have produced better efficiency. S. Menezes, H. Lewerenz, and K. Bachmann, *Nature* 305, 615 (1983). The same photoanode of the ternary chalcopyrite material and the same etchant were used as in the previous cell. The electrolyte consisted of 2 M $I^-$, 2.5 M HI, 50 mM $I_2$ and 20 mM $Cu^+$. An efficiency of 9.5% was reported with an output that was considered nearly stable, which was attributed to the formation of an interfacial film.

Other known etchants include $Br_2$/MeOH, which has been used on p-$CuInSe_2$. H. Haupt and K. Hess, *Inst. Phys. Conf. Ser.* 35, 5 (1977).

Further improvements in efficiency as well as attainment of complete stability are clearly desired in order to improve the economics of solar cell utilization on a widespread basis. To achieve the foregoing and other objects and in accordance with the purpose of the present invention, as embodied and broadly described herein, the photoelectrochemical cell of this invention may comprise the following.

SUMMARY OF THE INVENTION

Against the described background, it is therefore a general object of the present invention to provide a stable photoelectrochemical cell with a conversion efficiency of over 10%.

Another object of the invention is to provide an improved process for fabricating a photoelectrochemical solar cell utilizing n-$CuInSe_2$ as the photoanode.

It is a more specific object of the invention to provide a process for fabricating a solar cell utilizing a photoanode of n-$CuInSe_2$ with a conversion efficiency greater than 10%, a greatly diminished rate of output decay over time, and an iodide solution with a pH less than 9, which also implies a stable electrolyte solution.

Additional objects, advantages and novel features of the invention shall be set forth in part in the description that follows, and in part will become apparent to those skilled in the art upon examination of the following or may be learned by the practice of the invention. The object and the advantages of the invention may be realized and attained by means of the instrumentalities and in combinations particularly pointed out in the appended claims.

In a photoelectrochemical solar cell and method of fabrication, a photoanode of n-$CuInSe_2$ is coated with a surface layer of oxidized indium. A cathode is joined to the photoanode by an electrolyte providing a liquid junction. The electrolyte employs the iodine/iodide redox couple and, in addition, contains a predetermined number of Cu ions and a predetermined number of In ions.

In the fabrication of the solar cell, the n-$CuInSe_2$ electrode material is chemically etched and treated with heat prior to deposition of an indium film, which is subsequently oxidized by exposure to heat in an atmosphere including oxygen.

The accompanying drawings, which are incorporated in and form a part of the specification, illustrate preferred embodiments of the present invention, and together with the description serve to explain the principles of the invention.

DETAILED DESCRIPTION OF THE PREFERRED EMBODIMENTS

Figure 1:
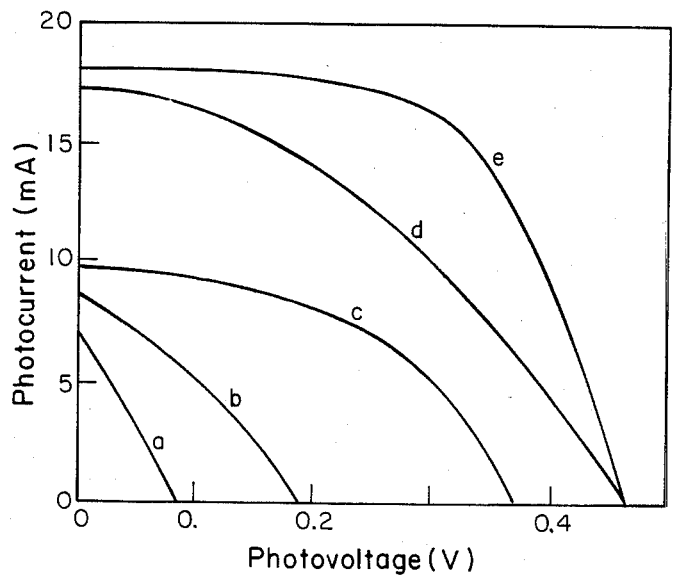
FIG. 1 are photocurrent-photovoltage curves (a)–(e) for n-$CuInSe_2$ single crystal electrodes in 6 M KI, 0.5 M $I_2$ solution at pH ~7, as a function of surface treatment according to corresponding conditions (a)–(e) of Example 2.

The ternary semiconducting material $CuInSe_2$ is known as a desirable photoanode material in photoelectrochemical cells because of its direct band gap of about 1.0 eV. However, the solar efficiency of such cells thus far has not reached 10%, which is considered a desirable minimum for widespread use. The present invention relates to the use of such known chalcopyrites as the photoanode in a cell employing the known iodine/iodide ($I_2/I^-$) redox couple used in a liquid, preferably aqueous electrolyte, which previously has been observed to have rapid output decay. The addition of $Cu^+$ or $Cu^{2+}$ and $In^{3+}$ salts to iodide solution now has been found to reduce the rate of decay. Further, the addition of an oxidized indium layer on the $CuInSe_2$ surface achieves stability at or above the desired conversion efficiency of 10%.

The electrode material should contain Cu, In, and Se in such ratios that the formula $(Cu_2Se)_x(In_2Se_3)_{1-x}$, with $x<0.55$ is satisfied $\pm 10$ atomic percent for each element. The electrolyte pH is preferred to be between about 4 and 9, which allows the cell to be prepared and to remain stable for a period of years without special precautions to exclude oxygen. A pH below 4 may be used, but for long term stability requires preparation and operation of the cell with the exclusion of oxygen.

The electrolyte should contain a high concentration of $I^-$, preferably greater than 3 M; and a low effective concentration of $I_2$, preferably in the range from 0.01 M to 0.1 M. It is noted that in solution the iodide and iodine react to form an $I^-/I_3^-$ redox couple. The final concentration of $Cu^+$ ions is in a preferred range from about 0.02 M to 0.2 M. The concentration of $In^{3+}$ ions ranges from approximately equal to the final concentration of $Cu^+$ ions to approximately one-fourth the $Cu^+$ ion concentration, or 0.2 M to 0.005 M, and should be lower with a higher pH of the electrolyte, a concentration of about 0.05 M being preferred. Suitable sources of $I^-$ ions include KI. The Cu ions may be added as $Cu^{2+}$ from, for example, $CuI_2$ or $CuCl_2$, or as $Cu^+$ from, for example, CuCl or CuI, while the In ions may be supplied, for example, by $InI_3$ or $InCl_3$. When $Cu^{2+}$ is the ion added, it is unnecessary to directly add $I_2$, as $Cu^+$ and $I_2$ are formed by reaction of $Cu^{2+}$ and $I^-$.

The semiconductor photoanode is coated directly with an oxidized layer of indium metal having a preferred thickness of from 20 to 300 Angstroms, which layer may be supplied by any of the various deposition methods known in the art, such as by electroplating or vacuum deposition. An integral part of the invention is that prior to coating, the semiconductor surface is optimized for photoelectrochemical energy conversion by surface treatments involving chemical etching in $Br_2/MeOH$ and heating in air or oxygen. The preferred etch is in a 2% (V/V) solution for 30 seconds. The solution may range from 1% to 5% (V/V) with the etch time being correspondingly varied from 60 seconds to 5 seconds. The subsequent air heating of the etched electrode material is preferred to be at 150° C. for three hours. The temperature may range from 80° to 150° C. for a time from ½ to 5 hours. Subsequent to the air or oxygen annealing, the annealed surface is coated with indium metal, which has been applied in thicknesses as great as 0.3 micrometers, based on total geometric area of exposed electrode material. The plated electrode is then air-heated to oxidize the indium coating, for example at 90° C. for 3-½ hours.

Use of the described electrolyte with the noted addition of Cu and In ions produces a photoelectrochemical cell with greatly reduced output decay. In addition, the deposition of the thin indium oxide layer on the electrode surface results in a stable system, when used with the described electrolyte. Detailed preparation of the cell is described in the following representative examples.

EXAMPLE 1

An 0.12 cm$^2$ n-$CuInSe_2$ electrode was prepared in the fashion known in the art. A layer of In was deposited on it by electroplating, after the surface had been optimized by etching for 30 seconds in 2% $Br_2/MeOH$ solution and heating in air at 150° C. for 3 hours. The electrode with the In coating layer was further heated in air to oxidize the In film. The cell cathode is conventionally of graphite or carbon. An electrolyte solution was employed containing 6 M KI, 0.2 M $CuCl_2$ and 0.1 M $InCl_3$. The cell showed a greater than 10% conversion efficiency at 125 mW/cm$^2$ equivalent (concentrated) sunlight. No output decay was observed for the passage of >10,000 C/cm$^2$ for this system, while it operated at >50 mA/cm$^2$ current density.

EXAMPLE 2

A 0.36 cm$^2$ single crystal photoelectrode of n-$CuInSe_2$ was prepared in the known fashion and tested in an electrolyte of aqueous 6 M KI, 0.5 M $I_2$ solution at pH $\sim 7$, as a function of surface treatment. Solution redox potential ($I_3^-/I^-$) is $\sim +0.30$ V vs. SCE. A Pt counter electrode was used. Measurements were made at room temperature. The electrode was initially polished with $Al_2O_3$ to 0.05 micrometers. The corresponding photocurrent (mA)photovoltage (V) curves (a)–(e) of FIG. 1 were plotted for the following conditions:
(a) Polished electrode.
(b) As (a), after a subsequent 5 sec. etch in 2% (V/V) $Br_2/MeOH$.
(c) As (b), but etched for 20 sec.
(d) As (c), after a subsequent 1 hour anneal at 150° C.
(e) As (d), but annealed for 3 hours.

The resulting plots show consistent increases in area under the curves from (a) to (e).

EXAMPLE 3

Short-circuit photocurrent decay was measured for n-$CuInSe_2$ electrodes optimized according to Example 2(e) in 6 M KI, 20 mM $I_2$, at pH $\sim 7$. Potentiostatic measurements were taken under ca. 3–4 times AMI equivalent illumination. The corresponding J (short-circuit), mA/cm$^2$ vs. time (sec.) curves (a)–(e) were plotted for the following conditions:
(a) Without further surface or solution modifications.
(b) With the addition of 50 mM $InCl_3$.
(c) With the addition of 50 mM CuI.
(d) With the addition of 50 mM CuI and 50 mM $InCl_3$.
(e) As (d), but with electrode coated with a film of oxidized indium.

The indium coating of experiment 3(e) was electrodeposited to 0.3 micrometer thickness, after which the plated electrode was air heated at 90° C. for 3-½ hours.

Figure 2:
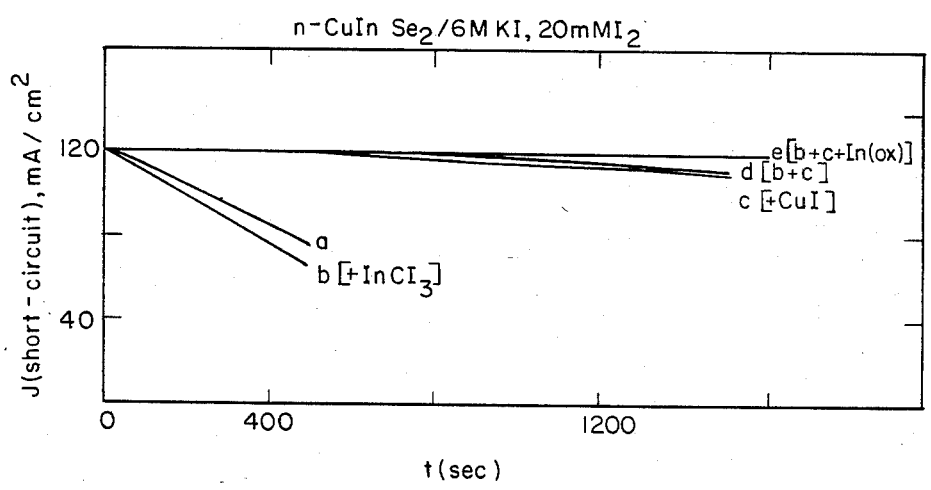
FIG. 2 are short-circuit photocurrent decay curves (a)–(e) for n-$CuInSe_2$ electrodes, optimized according to Example 2(e) in 6 M KI, 20mM $I_2$ at pH ~7, according to corresponding conditions (a)–(e) of Example 3.

The five curves of FIG. 2 originate at a value of J at 120 mA/cm$^2$. Curve (a) declines to approximately 80 mA/cm$^2$ within approximately 450 seconds. Curve (b) declines to approximately 80 mA/cm$^2$ in approximately 380 seconds. Curve (c) declines to approximately 110 mA/cm$^2$ in approximately 1500 seconds. Curve (d) declines to approximately 112 mA/cm$^2$ in approximately 1500 seconds.

Figure 3:
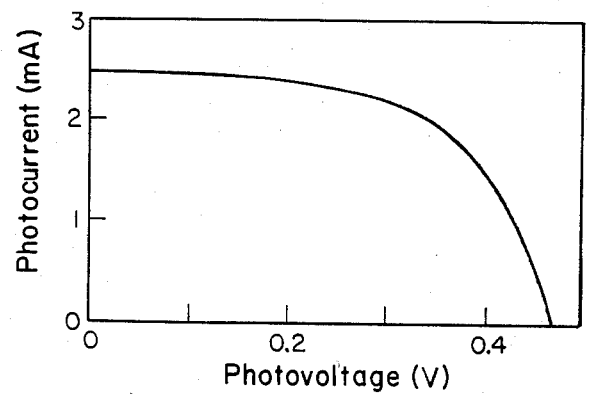
FIG. 3 is a photocurrent-photovoltage curve for n-$CuInSe_2$ electrode in 6 M KI, 0.2 M $Cu^{2+}$ and 0.1 M $In^{3+}$, pH ~7, with room temperature measurements, and the electrode was optmized according to Example 2(e) and Example 3(e).

In contrast, curve (e) of FIG. 2 remains stable at 120 mA/cm$^2$ past 1600 seconds. FIG. 3 shows the photocurrent-photovoltage curve for electrodes prepared according to the conditions of curve (e) of FIG. 2. Power conversion efficiencies up to 11.7% were measured under tungsten-halogen illumination of 120–145 mW/cm$^2$. At 50 mA/cm$^2$ short-circuit current, 20 kC/cm$^2$ photocharge passed with no change in output parameters and no visible change of the electrode surface. Similarly, at 40 mA/cm$^2$ maximum power current more than 15 kC/cm$^2$ photocharge passed, while all output characteristics were retained.

EXAMPLE 4

Photocurrent-photovoltage measurements as a function of chemical surface treatment were taken for single crystal n-CuInSe$_2$ in aqueous solution of 6 M KI and 0.5 M I$_2$. Electrodes were polished with Al$_2$O$_3$ to 0.05 micrometers before each run. Electrode area was 0.36 cm$^2$ and light intensity was 1.5–2×AM1. Electrode performance was evaluated for the following surface treatments:
 (a) As is (no surface treatment).
 (b)–(g) After etching electrode with 2% (V/V) Br$_2$/MeOH for, respectively, 5, 10, 15, 20, 30, and 60 seconds.

Figure 4:
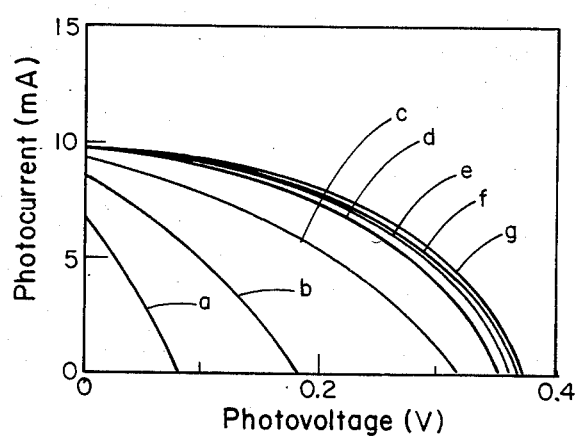
FIG. 4 are photocurrent-photovoltage plots (a)–(g) of single crystal n-$CuInSe_2$ in aqueous solution of 6 M KI and 0.5 M $I_2$, as a function of chemical surface treatment according to the corresponding conditions (a)–(g) of Example 4.

The resulting photocurrent-photovoltage plots (a)–(g) of FIG. 4 show a consistent improvement in cell performance by the increase in area under the curves from (a) to (g). The relative closeness of curves (e)–(g) demonstrates that an etch time in the range from 20 to 60 seconds approaches a limit for improved performance, with an etch time of 30 seconds being preferred.

EXAMPLE 5

The electrode of experiment 4(f) was employed for photocurrent-photovoltage measurements as a function of heating time in air following etching, under the following conditions of the electrode:
 (a) As is, etched only.
 (b)–(f) Electrode heated for 0.5, 1, 2, 3, and 16 hours, respectively.

Figure 5:
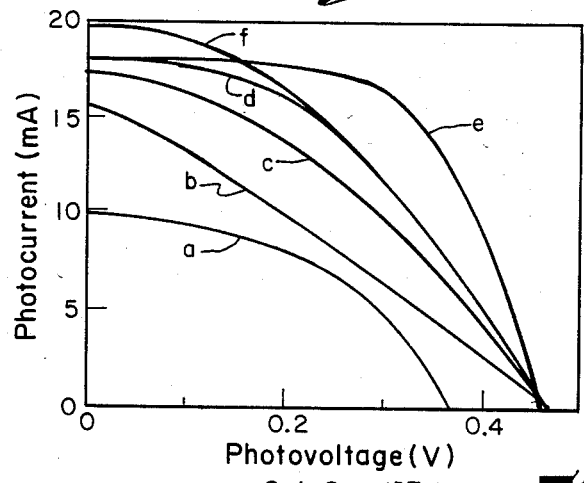
FIG. 5 are photocurrent-photovoltage plots (a)–(f) for electrodes of Example 4(f), as a function of heating time in air following etching, according to the corresponding conditions (a)–(f) of Example 5.

Resulting plots of (b) through (e) of FIG. 5 each show an increase in area under the curve, as compared to curve (a), as well as a consistent increase in area from curve (b)–(e). However, photocurrent for curve (f) drops more rapidly than for curve (e), approximating the decline of curve (d) past 0.25 V. Therefore, curve (e) represents approximately the optimum etch time for the conditions of the example.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be regarded as falling within the scope of the invention as defined by the claims that follow.

The embodiments of the invention in which an exclusive property or privilege is claimed are defined as follows:

1. A photoelectrochemical solar cell, comprising:
 a photoanode of n-CuInSe$_2$ with a surface layer of oxidized indium thereon;
 a cathode; and
 an electrolyte providing a liquid junction between said photoanode and cathode and comprising an iodine/iodide redox couple, and predetermined amounts of Cu and In ions sufficient to provide enhanced long term stability.

2. The photoelectrochemical solar cell of claim 1, wherein said photoanode carries an etched and annealed surface below said surface layer of oxidized indium.

3. The photoelectrochemical solar cell of claim 2, wherein said electrolyte comprises a combination of iodide ions in concentration greater than 3 M; iodine in concentration greater than 0.01 M but less than 0.1 M; Cu$^+$ ions in concentration between about 0.02 to 0.2 M; and In$^{3+}$ ions in concentration between about 0.005 to 0.2 M.

4. The photoelectrochemical solar cell of claim 1, wherein the electrolyte has a pH of between about 4 to 9.

5. A method of fabricating a photoelectrochemical solar cell of the type having a photoanode of n-CuInSe$_2$ electrode material and having an iodine/iodide redox couple and a predetermined final concentration of Cu$^+$ ions in a liquid electrolyte, comprising the steps of:
 etching the electrode material by a chemical means;
 heating the etched electrode material;
 depositing a film of indium on said etched surface; and
 oxidizing the deposited film.

6. The method of claim 5, wherein said chemical etching means comprises Br$_2$/MeOH.

7. The method of claim 5, wherein said etching step comprises contacting the electrode material with a solution of Br$_2$/MeOH having a concentration of from 1% to 5% (V/V) for a period of time between 60 seconds and 5 seconds.

8. The method of claim 5, wherein said heating of the etched electrode is conducted at a temperature of not substantially more than about 150° C. for a time of not substantially more than approximately 3 hours.

9. The method of claim 5, wherein said heating of the etched electrode is conducted at a temperature between about 80° C. and 150° C. for a time between about one-half hour and five hours.

10. The method of claim 5, wherein said indium film is thermally oxidized by heating in an atmosphere containing oxygen.

11. The method of claim 10, wherein said indium film is oxidized by heating in air at a temperature of no more than about 90° C. for a time of no more than about 3.5 hours.

12. The method of claim 5, wherein an oxidized film layer of indium is formed which is between about 20 and 300 Angstroms in thickness.

13. The method of claim 5, wherein said step of depositing a film of indium is conducted to produce a film thickness of at least about 20 Angstroms.

14. The method of claim 5, including the further step of immersing the oxidized electrode in an electrolyte of pH between about 4 and 9.

15. The method of claim 5, further comprising adding to said electrolyte In$^{3+}$ ions in a predetermined concentration.

16. The method of claim 15, wherein said predetermined concentration of In$^{3+}$ ions is between about said final concentration of Cu$^+$ ions and one-fourth of the final concentration of Cu$^+$ ions.

17. The method of claim 16, wherein the concentration of Cu$^+$ ions is approximately 0.02 to 0.2 M.

18. The method of claim 15, wherein said predetermined concentration of In$^{3+}$ ions is about 0.05 M.

19. The method of claim 5, wherein said heating of the etched electrode material, is conducted in an atmosphere comprising oxygen.

20. An improved photoelectrochemical solar cell of the type having n-CuInSe$_2$ electrode material in a liquid electrolyte comprising an iodine/iodide redox couple and a predetermined concentration of Cu ions selected to provide enhanced long term stability, wherein the improvement comprises a film of oxidized indium metal formed on the surface of said n-CuInSe$_2$ electrode material.

21. The improved photoelectrochemical solar cell of claim 20, wherein the improvement further comprises an etched and subsequently annealed-in-air electrode material surface underlying said surface film of oxidized indium.

22. The improved photoelectrochemical solar cell of claim 20, further comprising a predetermined concentration of indium ions in said electrolyte.

23. The photoelectrochemical solar cell of claim 22, wherein the predetermined concentration of In ions is approximately 0.005 to 0.2 M.

24. The photoelectrochemical solar cell of claim 22, wherein the electrolyte has a pH of between 4 and 9.

* * * * *